United States Patent [19]

Fukuda

[11] Patent Number: 4,703,516

[45] Date of Patent: Oct. 27, 1987

[54] CHARACTER IMAGE DATA COMPRESSION SYSTEM

[75] Inventor: Shinichiro Fukuda, Tokyo, Japan

[73] Assignee: Shaken Co., Ltd., Tokyo, Japan

[21] Appl. No.: 748,147

[22] Filed: Jun. 25, 1985

Related U.S. Application Data

[63] Continuation of Ser. No. 372,151, Apr. 27, 1982, abandoned.

[30] Foreign Application Priority Data

Dec. 28, 1981 [JP] Japan .................................. 56-211909

[51] Int. Cl.⁴ .............................................. G06K 9/36
[52] U.S. Cl. ........................................ 382/56; 358/260
[58] Field of Search .................................. 382/26, 56; 358/260–262

[56] References Cited

U.S. PATENT DOCUMENTS

| 4,189,711 | 2/1980 | Frank | 382/56 |
| 4,204,232 | 5/1980 | Mizuno | 382/56 |
| 4,229,768 | 10/1980 | Kurahayashi et al. | 382/56 |

Primary Examiner—Leo H. Boudreau
Attorney, Agent, or Firm—Sherman and Shalloway

[57] ABSTRACT

A character image data compression system for compressing binary data from an image corresponding to a two-dimensional character image, making it possible to optionally output the coded data in conformity with the characteristic of a character image having complicated composition, thereby to improve the data compression ratio as a whole character and make the capacity of a character data memory compact.

9 Claims, 15 Drawing Figures

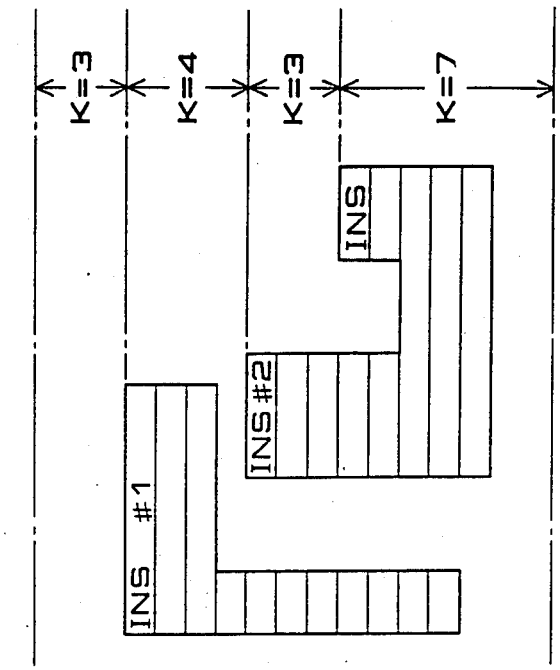
FIG. 2I
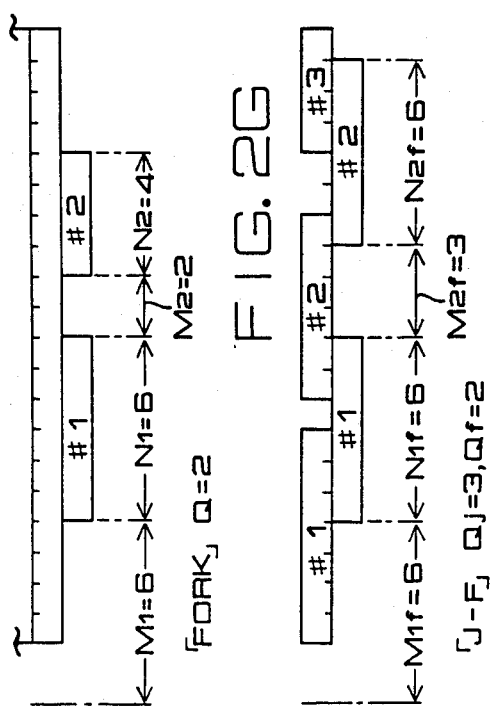
FIG. 2G
FIG. 2H
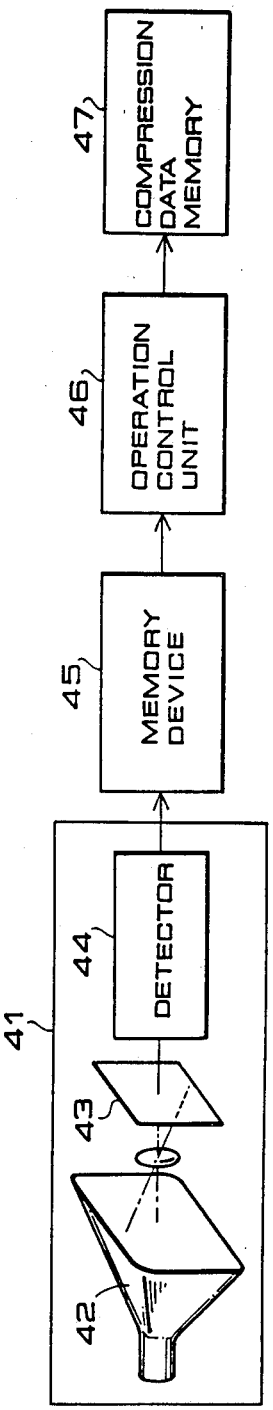
FIG. 4

FIG. 3A

CHARACTER IMAGE DATA COMPRESSION SYSTEM

This application is a continuation, of application Ser. No. 372,151, filed Apr. 27, 1982, now abandoned.

BACKGROUND OF THE INVENTION

This invention relates to a character image data compression system for compressing binary data from an image matrix corresponding to a two-dimensional character image, and particularly, provides a character image data compression system suitable for Chinese characters (hereinbelow called "Kanji" etc. in which, in a case where a character image segment occurs in adjacent lines (hereinafter called "previous line" and present line"), mutual "contact modes" in a row direction (normal to a line direction) of the character image segments in two sequential lines are discriminated and coded data relating to different types of information is outputted incidentally to a control code prescribing the contact modes. The term "contact mode" is used herein to mean the spatial relationship between the part of the character image appearing in the previous line, and the part in the present line.

FIG. 1 shows one example of bit data (binary data) of Chinese character "図" which is used in relatively high frequency as "kanji" and obtained by a raster scanning method in which a line direction is considered to be main scanning direction, the example being shown as typical bit explosion in matrix.

As is apparent from FIG. 1, the "kanji" is far complicatedly composed of a large number of line or curve ports in comparison with an alpha-numeric language (European language; numeral), and in view of character image segments in the bit data of the respective line directions, fork and joint phenomena are frequently recognized in some portions every time when the line changes, for example, in FIG. 1, the segments A and B join to the segment C and the segment D forks into the segments E, F, and G.

Conventionally, a so-called run-length method are well known and a two-dimensional difference method as compression techniques of character image data and also known are methods which have improvements over the aforementioned methods. However, these conventional methods do not consider at all the characteristics of the "kanji" or take less consideration thereof, so that it will be said that these conventional methods are necessarily suitable for a compression method of "kanji" data.

Moreover, with respect to the "kanji", it is necessary to always keep 2,000 to 3,000 types of characters per one font which are used with relatively high frequency and, in a photocomposing technique, 10,000 to 12,000 types of characters per one font which are used with relatively low frequency, so that data compression ratio affects significantly the saving in capacity for a memory of the character image data. For example, in a case where one character is analyzed into a matrix of 400×400 image elements total data in the case of 10,000 character types before compression includes 400×400×10,000 (bits)=200 (megabytes), and accordingly, the improvement of 1 point of the data compression ratio results in saving the memory 2 megabytes and results in cost reduction.

SUMMARY OF THE INVENTION

An object of this invention is to provide a character image data compression system including a process suitable for processing the characteristics of the "kanji" and having improvements over the conventional run-length method or two-dimensional difference method.

Another object of this invention is to improve the data compression ratio by utilizing the system of the type described above, thereby to save the memory of the character image data and result in cost reduction.

The conventional run-length method is based on the coding of the uniform character image on the basis of the length N of a character image segment and the length M of a background portion in advance of the segment. The conventional two-dimensional difference method is based on the coding of the character image in accordance with the difference amount between positions of the start and final points of each segment in the two sequential lines.

On the other hand, the compression system according to this invention is characterized by the steps of comparing data of the previous line and present line, discriminating contact mode in a row direction of a character image segment existing in the lines, and obtaining compression data which is prepared by coded modes different in each segment in accordance with the result of the discrimination.

According to this invention, generation, deletion, and contact modes of each segment existing in an optional line could be specified even with respect to a "kanji" having complicated composition by properly combining six kinds of the following segment contact modes, the segment contact modes being:

(1) Insertion Mode (INS)
Where no segment contacting to one segment in the present line exists in the previous line.

(2) Simple Contact (Difference) Mode (DIF)
Where one segment in the previous line contacts to one segment in the present line.

(3) Join Mode (JOIN)
Where a plurality of segments in the previous line contact to one segment in the present line.

(4) Fork Mode (FORK)
Where one segment in the previous line contacts to a plurality of segments in the present line.

(5) Join-Fork Mode (J-F)
Where a plurality of segments in the previous line contact to a plurality of segments in the present line.

(6) Deletion Mode (DEL)
Where no segment contacting to one segment in the previous line exists in the present line.

In addition, according to this invention, the shape of an optional character image could be completely specified by commonly using the six contact modes described above and auxiliary modes such as an end of line and new line mode (EOL) and an end of file mode (EOF) which are not directly related to the generation, disintegration and contact modes of the segments.

Among the auxiliary modes, the EOL, which will be described in detail hereinafter, corresponds to a case where a new segment corresponding to the INS exists and the EOF corresponds to a case where the character image data finishes.

According to the system of this invention different types of information can be encoded respectively in response to the aforementioned modes, and therefore, character data composed of complexed segments can be effectively compressed by outputting the encoded data incidentally to a control code prescribing the contact modes.

BRIEF DESCRIPTION OF THE DRAWINGS

FIGS. 2A through 2I show types of informations to be encoded with respect to respective contact modes;

Figure 3A:
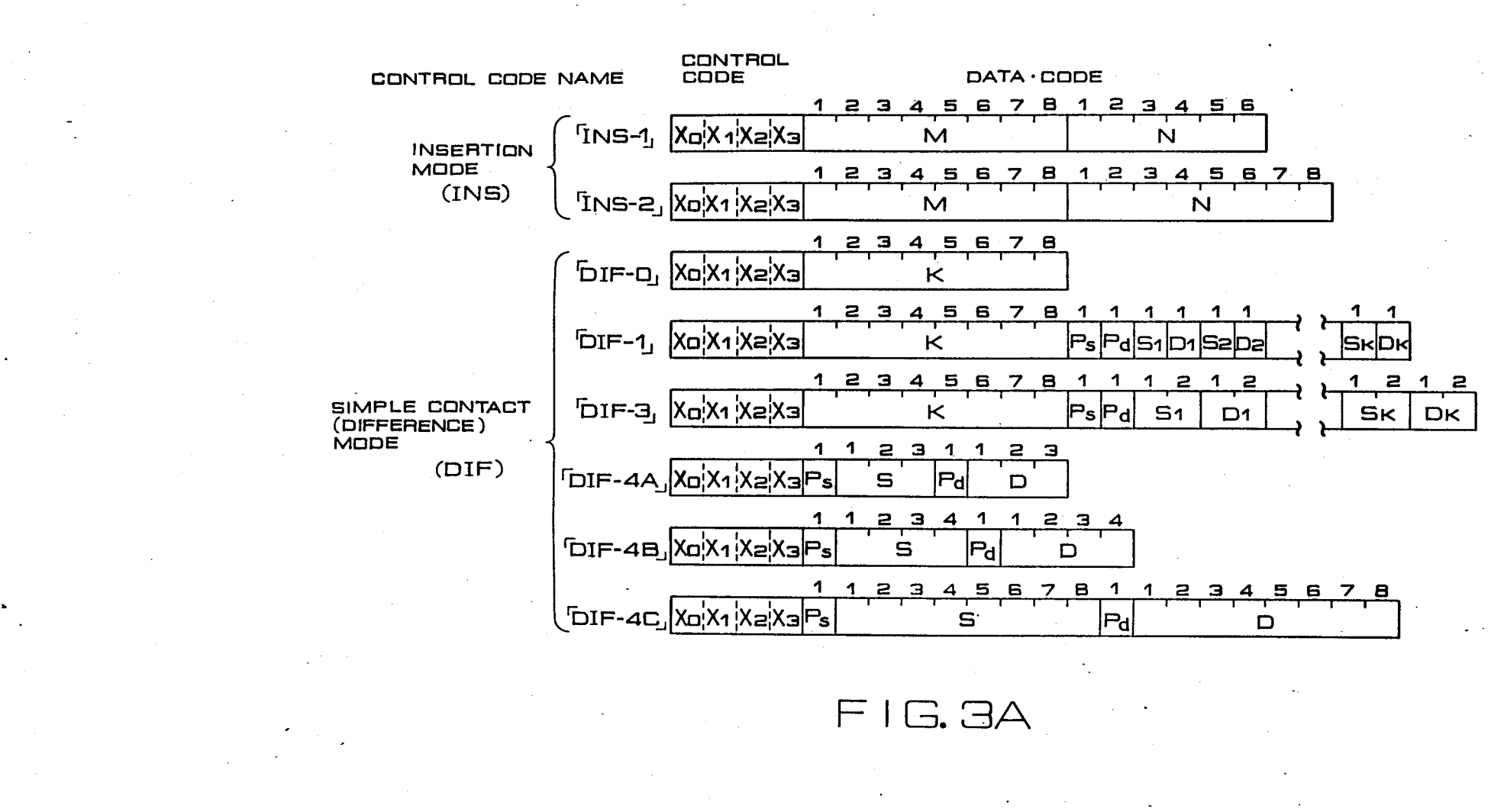

FIGS. 3A and 3B show examples of code formats;

FIG. 4 is a schematic view showing one example of composition for obtaining coded data according to the compression system of this invention.

PREFERRED EMBODIMENTS OF THE INVENTION

FIG. 2 typically shows concrete contents of the respective modes and types of information to be encoded and in FIG. 2 one segment is formed by each rectangular block in one line. Further, FIG. 3A and FIG. 3B are diagrams showing examples of a preferred code format to encode these informations. As shown in FIG. 3, the code format comprises control codes consisting of 4 bits ($X_0$, $X_1$, $X_2$, $X_3$) arranged to discriminate the aforesaid various modes and data codes having variable lengths succeeding to the control codes.

The actual contents and types of the information to be actually encoded and one example of code format will be described hereinbelow in conjunction with FIGS. 2 and 3.

{INSERTION MODE (INS)}

Figure 1:
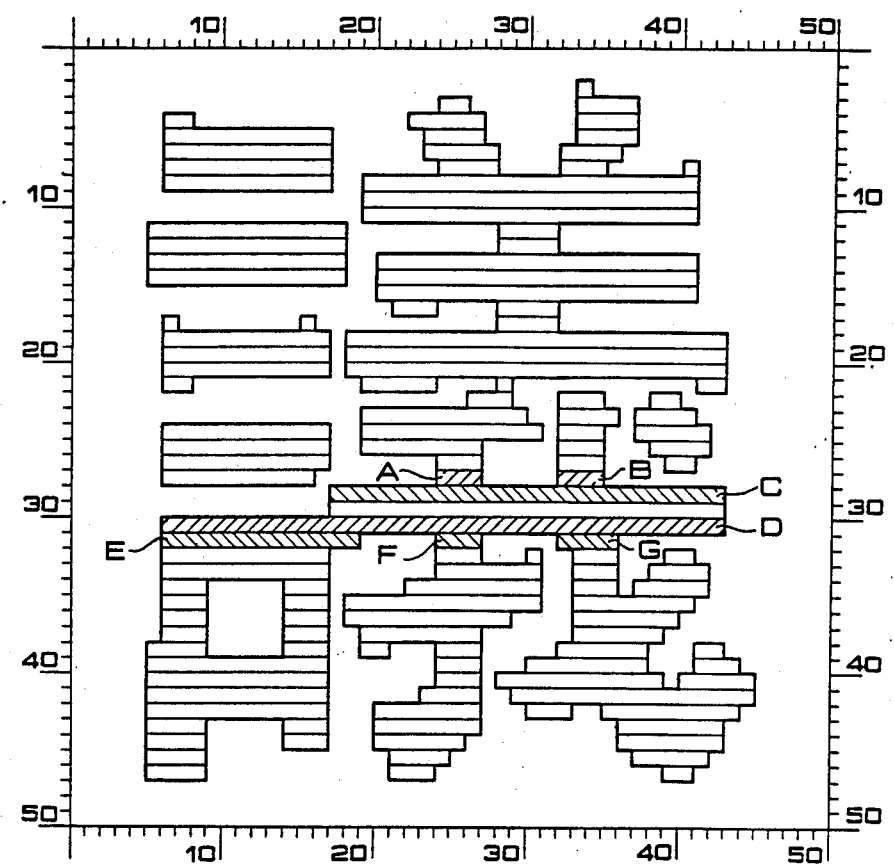
FIG. 1 is a view showing one example of character data which is typically bit-exploded in matrix type.
Figure 2A:
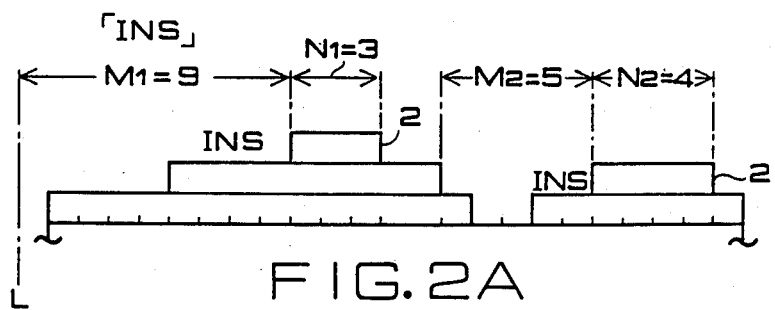
Figure 3B:
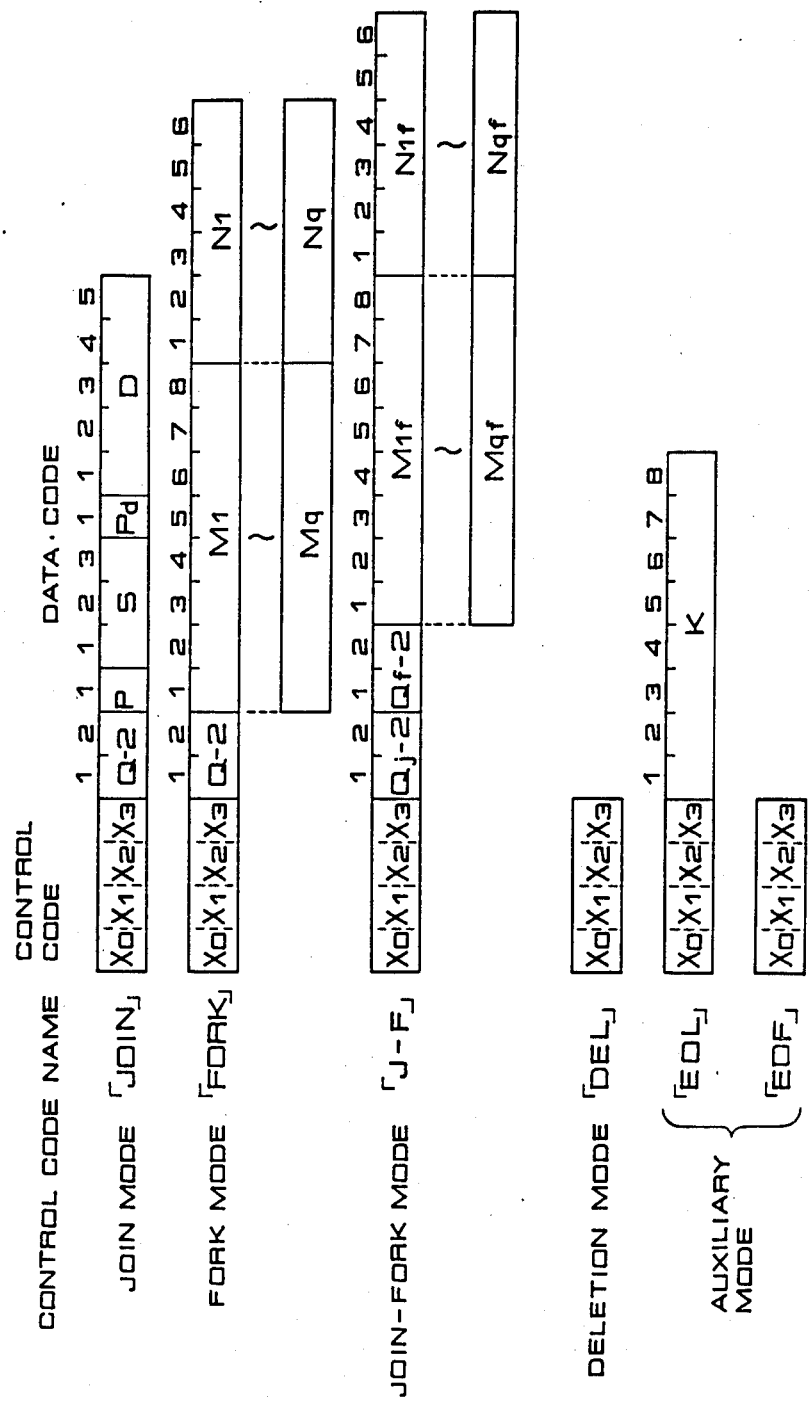

In a case where, such as regarding a segment 2 shown in FIG. 2A, a corresponding contact segment does not exist in the previous line and a new segment is generated and inserted there, information is encoded regarding (1) the length M of a background portion preceding the segment (i.e. length M from the end of the line L in case of no preceding segment) and (2) information regarding the length N of the segment.

In this processing in order to control diffuseness of a data code to be encoded, it is desired to classify the INS into either one of respectively different insertion mode (INS-1) or (INS-2) in response to the length N of the segment (for example, in response to a time when N is below "63" which can be expressed by 6 bits, or over "64" which can be expressed by 7 bits.) In FIG. 3A, there is shown one example of code format of the information coded by the aforesaid insertion mode (INS) as control code (INS-1) or (INS-2).

{SIMPLE CONTACT (DIFFERENCE) MODE (DIF)}

In a case where, such as regarding respective segments shown in FIG. 2B through FIG. 2E, one segment in the previous line contacts to only one segment in the present line in a row direction, the DIF is classified into the following four modes in response to value difference amounts (S;D) at bilaterial both ends of each contact segment.

Figure 2B:
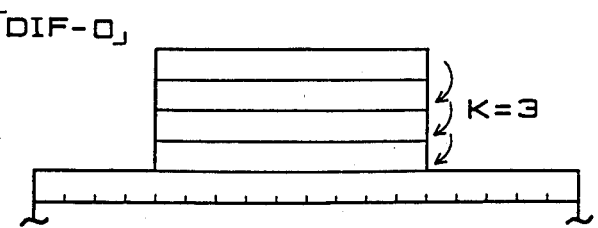

(1) [Difference 0 Mode (DIF-0)] FIG. 2B
   Where both of the difference amounts (S;D) are "0".
(2) [Difference 1 Mode (DIF-1)] FIG. 2O, left half
   Where both of the difference amounts (S;D) are below "1".

(3) [Difference 3 Mode (DIF-3)] FIG. 2C, right half FIG. 2E
   Where both of the difference amounts (S;D) are below "3".
(4) [Difference 4 Mode (DIF-4)] FIG. 2D
   Where one of the difference amounts (S;D) is over "4".

In the case of [Difference 0 Mode (DIF-0)], as shown in FIG. 2B, only the information regarding repeat number (K) of the Difference 0 Mode in the succeeding lines is encoded. In FIG. 3B, there is shown one example of code format of the information coded by the Difference 0 Mode as control code (DIF-0).

Figure 2C:
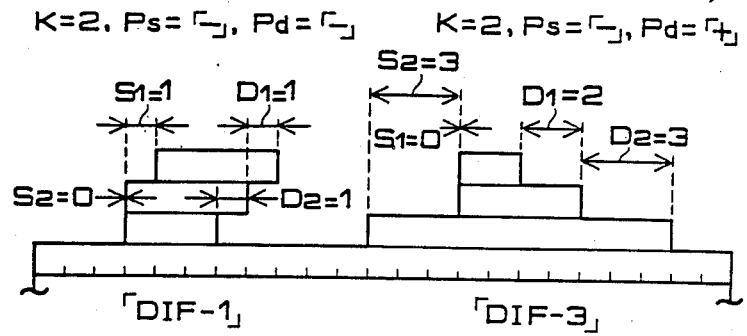

In either one of the cases of [Difference 1 Mode (DIF-1)] or [Difference 3 Mode (DIF-3)], as shown in FIG. 2C, the information is encoded regarding the repeat number (K) of the difference mode in the succeeding line and difference amounts (SK;Dk) of the respective following segment corresponding to the repeat number (K) and the polarity information (Ps;Pd) of the difference amounts (Sk;Dk).

In this case, it can be facilitated to delete the diffuseness of the data to be encoded by applying only the polarity information of one type regarding the K number of the difference amounts (Sk;Dk) by taking into consideration such a characteristic as the fact that the shape of the character image has a continuous inclination in a certain interval.

In FIG. 3, there is shown one example of code format of the information coded by the Difference 1 Mode or Difference 3 Mode as control code (DIF-1) or (DIF-3).

Figure 2D:
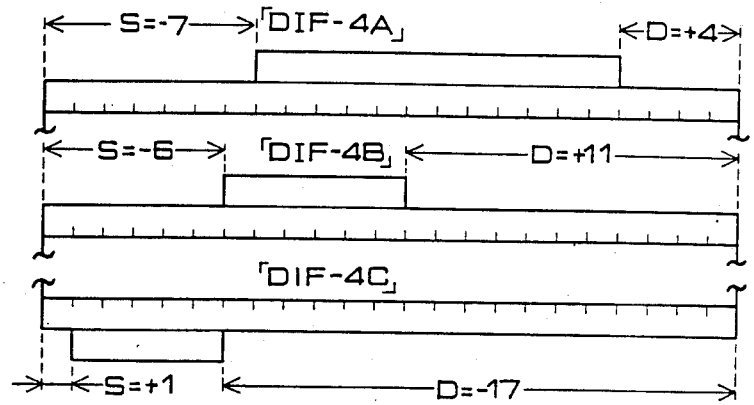

In the case of [Difference 4 Mode (DIF-4)], as shown in FIG. 2D, are encoded in every segment the information regarding the difference amounts (S;D) and the polarity information (Ps;Pd) thereof.

However, in the case of [Difference 4 Mode (DIF-4)], as further shown in FIG. 2D, it is classified into [Difference 4A Mode (DIF-4A)], [Difference 4B Mode (DIF-4B)], and [Difference 4C Mode (DIF-4C)] in accordance with cases where the difference amounts (S;D) are below "7", between "8–15", and over "16", respectively. There is shown in FIG. 3A, one example of the information coded by Difference 4 Mode as control code (DIF-4A), (DIF-4B) or (DIF-4C).

When the data of the aforementioned [Simple Contact (Difference) Mode (DIF)] is encoded, precedence order of the respective difference modes is basically set as follows.

[Difference 0 Mode] > [Difference 1 Mode] > [Difference 3 Mode] > [Difference 4A Mode] > [Difference 4B Mode] > [Difference 4C Mode].

However, this precedence order is not absolute and in cases where the difference amounts (S;D) are satisfied with a condition of below "3" (including "0", "1", and "2"), some extent of the diffuseness of the data code to be encoded will be deleted and the data compression ratio will be improved by selecting either one of [Difference 0 Mode], [Difference 1 Mode] or [Difference 3 Mode] in accordance with generating condition of segments in the succeeding lines of the aforementioned mode.

Figure 2E:
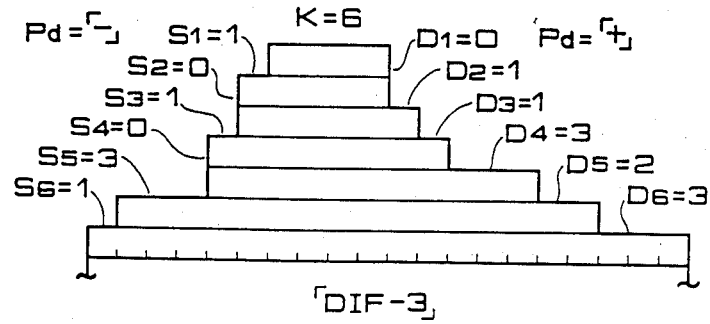

For example, in a case as shown in FIG. 2E, a plurality of segments can be synthesized as one mode and dealt with, in spite of the fact that the difference amounts (S;D) of lines up to the fourth line are "0" or "1" by dealing it with as the [Difference 3 Mode] of the type described above.

{JOIN MODE (JOIN)}

There is shown in FIG. 3B, one example of the information coded by the join mode as control code name (JOIN).

Figure 2F:
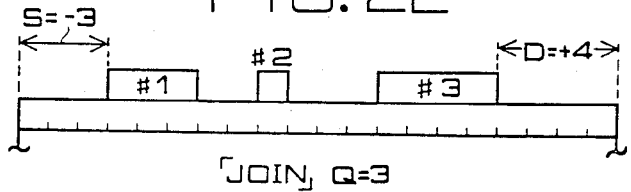

As shown in FIG. 2F, in a case that a plurality of segments in the previous line contact to one segment in the present line, are encoded the information regarding the number of segments (Q) to be joined and the difference amounts (S;D) between the most outward bilateral ends of a plurality of segments to be joined and the bilateral ends of one joined segment and polarity information (Ps;Pd) of the difference amount (S;D).

{FORK MODE (FORK)}

There is shown in FIG. 3B, one example of the information coded by the fork mode as control code name (FORK).

As shown in FIG. 2G, in a case where one segment in the previous line contacts to a plurality of segments in the present line, information regarding the forked segment number (Q), and the run-lengths (mq;Nq) of the respective forked segments is encoded.

{JOIN-FORK MODE (J-F)}

There is shown in FIG. 3B, one example of the information coded by the Join-Fork mode as control code name (J-F).

As shown in FIG. 2H, in a case that a plurality of segments in the previous line contact to a plurlaity of segments in the present line, information regarding the jointed segment number (Qj), the forked segment number (Qf), and the run-lengths (Mqf;Nqf) of the respective forked segments is encoded.

{END OF LINE AND NEW LINE MODE (EOL)}

As shown in FIG. 2I, in a case that there exists a new second segment in which the most righthand segments in lines after the present line correspond to the insertion mode (INS) with respect to the first segment corresponding to the insertion mode (INS), the information K pertains to the number of new lines from the first segment to the second segment. In this case, the upper and lower ends of the data matrix in the row direction are considered as the start and final lines, respectively.

{DELETION MODE (DEL)} OR {END OF FILE MODE (EOF)}

There is shown in FIG. 3B, one example of the information coded by the end of line and new line mode as control code name (EOL).

In a case where no contact segment exists in the present line or where character image data finishes, only the deletion mode (DEL) control code or the end of file mode (EOF) control code is outputted.

Types of the information encoded in response to the discriminated modes and relationship between the information and the character image data have been described hereinabove in conjunction with FIG. 2.

In this case, the join-fork segment number (Q) which can be treated as data can be increased substantially by "2".

FIG. 4 is a schematic view showing example of a system for requiring coded data as described above.

Referring to FIG. 4, reference numeral 41 designates a scanner device for obtaining binary data from a matrix image corresponding to a two-dimensional character image and the scanner device 41 operates, for example, in such a manner that transmitted light or reflected light from a character image pattern 43 irradiated by scanning light from a flying-spot tube 42 is detected by a detector 44 and the desired binary data is obtained by shape-sampling a signal from the detector 44 representing the detected light.

The binary data obtained by the scanner device 41 can be temporarily memorized by a memory device 45.

Reference numeral 46 designates an operation control unit which performs data processing of the binary data supplied by online or batch processing and outputs required coded data to a compression data memory 47, usually, the operation control unit 46 being preferably composed of an electronic computer.

Main processing order in the operation control unit 46 is as follows:
(1) To input the original binary data;
(2) To extract the segments and compare lines;
(3) To detect the contact modes of the segments;
(4) To check optimization of the respective contact modes;
(5) To decide the most suitable contact mode;
(6) To operate desired information regarding the decided contact mode;
(7) To encode the operated information; and
(8) To output the encoded data.

Figure 5A:
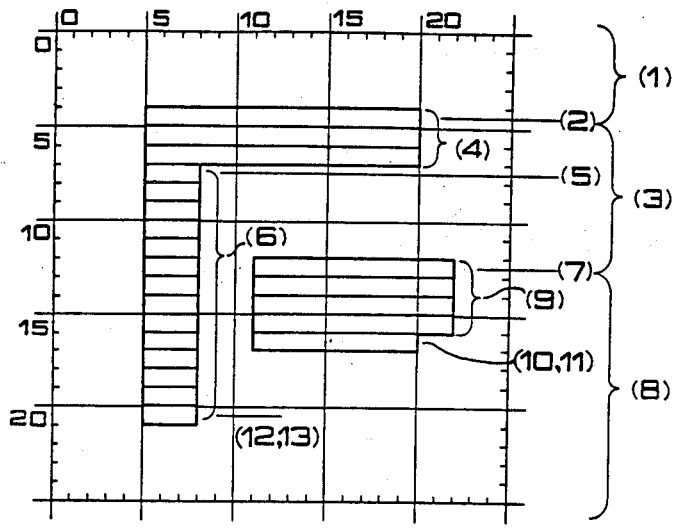
FIGS. 5A and 5B are views showing comparison of an actual coded data obtained by the system of this invention with a concrete figure.
Figure 5B:
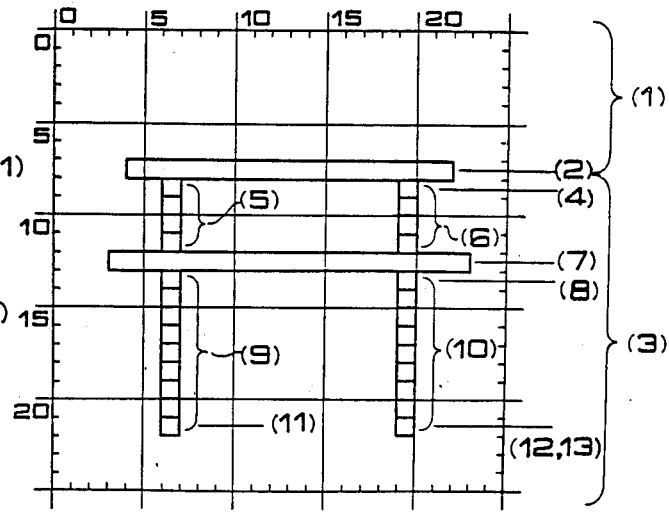

FIGS. 5A and 5B show an actual example of an encoded data obtained by the processing order described above according to the system of this invention in comparison with concrete figures each consisting of a image element of 25×25.

The character image data compression system according to this invention was inspected by applying it to an optionally selected 56 types of "kanji" and data compression ratio of 18.1% was obtained with respect to 100×100 image element per one character. Moreover, this proves that data compression ratio of 39.5% is obtained by applying the system of this invention to a different method under the same conditions as set forth above.

As described in detail hereinbefore, the character image data compression system of this invention in which binary data of matrix type corresponding to a two-dimensional character image is compressed is basically characterized by the steps of confirming existance of a character image segment in every data of each line direction, comparing the data of adjacent two sequential lines, i.e. previous line and present line, in the case of the existence of the character image segment, discriminating a contact mode in a row direction of the character image segment, and outputting, in response to the result of this discrimination, variable coded data regarding information of respectively different types incidentally to a control code prescribing the contact mode.

As described in the foregoing, this invention makes it possible to optionally output the coded data in conformity with the characteristic of a character image having complicated composition, typically, such as "kanji", thereby to improve the data compression ratio as a whole character and to make compact the capacity of a character data memory.

What is claimed is:

1. A character image data compression method for compressing matrix-type binary data having data elements formed in lines and in combination corresponding to a two-directional character image comprising the steps of:

detecting the occurrence or non-occurrence of a character image segment in each data element of the matrix in each line;

identifying a contact state in a vertical direction of said character image segment, by comparison of data in adjacent lines; and producing an output comprising a control code corresponding to said contact state, and variable length coded data corresponding to information of respectively different types in accordance with the type of contact state, said control code being applicable to all of said states, wherein the contact state in a vertical direction of said character image segment, is identified as any one of the following modes: an insertion mode (INS) in which no contact segment exists in a previous line, a simple contact different mode (DIF) in which one segment in the previous line contacts to one segment in a present line, a join mode (JOIN) in which a plurality of segments in the previous line contact to one segment in the present line, a fork mode (FORK) in which one segment in the previous line contacts to a plurality of segments in the present line, a join-fork mode (J-F) in which a plurality of segments in the previous line contact to a plurality of segments in the present line, and a deletion mode (DEL) in which no contact segment exists in the present line, and the encoded information includes a control code corresponding to the contact state, and also (a) information regarding a length (M) of a background portion prior to said segment and a length (N) of said segment in a case where said contact state corresponds to the insertion mode (INS), (b) information regarding difference amounts (S;D) at each end of respective contact segments and/or repeat number (K) of said simple contact difference mode of the succeeding lines, and/or polarity information (Ps;Pd) applying positive and negative polarities to said difference amounts (S;D) in a case where said contact state corresponds to the simple contact difference mode (DIF), (c) information regarding a number (Q) of segments to be joined and difference amounts (S;D) between extreme ends of a plurality of segments to be joined and ends of one joined segment, and polarity information (Ps;Pd) regarding said difference amounts (S;D) in a case where said contact state corresponds to the join mode (JOIN), (d) information regarding a number (Q) of forked segments and run-lengths (Mq;Nq) of formed segments in a case where said contact state corresponds to the fork mode (FORK), or (e) information regarding a number (Qj) of segments to be joined, the number (Qf) of the forked segments, and run-lengths (Mqf;Nqf) of said forked segments in a case where said contact state corresponds to join-fork mode (J-F), but when the contact state corresponds to the deletion mode, onlly a deletion mode control code (DEL) is produced.

2. An image-data compression method according to claim 1, in which, when the said contact state corresponds to the insertion mode (INS), insertion mode control codes different from one another are produced in accordance with the length N of said segment and one of two insertion mode control codes or may be produced in accordance with a case where said length N of the segment is below "63" or where said length of the segment is over "64".

3. An image data compression method according to claim 1, wherein in a case where said discriminated result of said contact state corresponds to the simple contact difference mode (DIF), difference mode control codes different from one another are outputted in accordance with said difference amounts (S;D).

4. An image data compression method according to claim 3, wherein, in the case where said difference amounts (S;D) are both "0", only a difference 0 mode control code is produced together with coded data regarding repeat number (K) of said simple contact difference mode in the succeeding lines.

5. An image data compression method according to claim 3, wherein the case where said difference amounts (S;D) are both "1" or less, or "3" or less, a difference mode control code or (DIF-1) or (DIF-3) is produced together with coded data regarding information of repeat number (K) of said simple contact difference mode in succeeding lines and difference amounts (Sk;Dk) of respective segments in the succeeding lines corresponding to said repeat number (K) and polarity information (Ps;Pd) of said difference amounts (Sk;Dk), and only one type of said polarity information (Ps;Pd) is applied commonly to said difference amounts (Sk;Dk) of said segment in the succeeding lines.

6. An image data compression method according to claim 3, wherein in the case where either of said difference amounts (S;D) is "4" or more, a difference mode control code is produced together with coded data regarding information of said difference amounts (S;D) and polarity information (Ps;Pd) of said difference amounts (S;D).

7. An image data compression method according to claim 6, wherein control codes different from one another are produced in accordance with values of said difference amounts (S;D) and any one of "difference 4" mode control codes, and is produced in accordance with any one of cases where said difference amounts (S;D) are "7" or less, "8-15", or "16" or more.

8. An image data compression method according to claim 1, wherein in a case where said contact state corresponds to the simple contact difference mode satisfying a condition that said difference amounts (S;D) are both "3" or less, any one of difference mode control codes, and is selected in accordance with a condition of generation of the contact state satisfying said difference amount condition in the following line and the selected control code is produced together with said coded data coincident with said selected control code.

9. An image data compression method according to claim 1, in which in a case where said contact state corresponds to any one of said join mode, said fork mode, and said join-fork mode, there is coded a value obtained by substracting "2" from the number of segments to be actually joined or forked.

* * * * *

UNITED STATES PATENT AND TRADEMARK OFFICE
CERTIFICATE OF CORRECTION

PATENT NO. : 4,703,516
DATED : October 27, 1987
INVENTOR(S) : SHINICHIRO FUKUDA

It is certified that error appears in the above-identified patent and that said Letters Patent is hereby corrected as shown below:

Column 7, line 64, Claim 1, "onlly" should read --only--.

Claim 4, line 4 of the claim, after "code", insert --(DIF-0)--.

Claim 6, line 4 of the claim, after "code", insert --(DIF-4)--.

Claim 7, line 5 of the claim, after "codes" delete the comma and insert --(DIF-4A), (DIF-4B), and (DIF-4C)--.

Claim 8, line 3 of the claim, after "mode", insert --(DIF)-- and in line 6 of the claim after "codes" delete the comma and insert --(DIF-0), (DIF-1) and (DIF-3)--.

Claim 9, line 3 of the claim after "mode", insert --(JOIN)--, in line 4 of the claim after "mode" (first occurrence) insert --(FORK)-- and in line 4 of the claim after "mode" (second occurrence) insert --(J-F)--.

Signed and Sealed this

Twenty-second Day of November, 1988

Attest:

DONALD J. QUIGG

Attesting Officer    Commissioner of Patents and Trademarks